United States Patent Office 2,989,081
Patented June 20, 1961

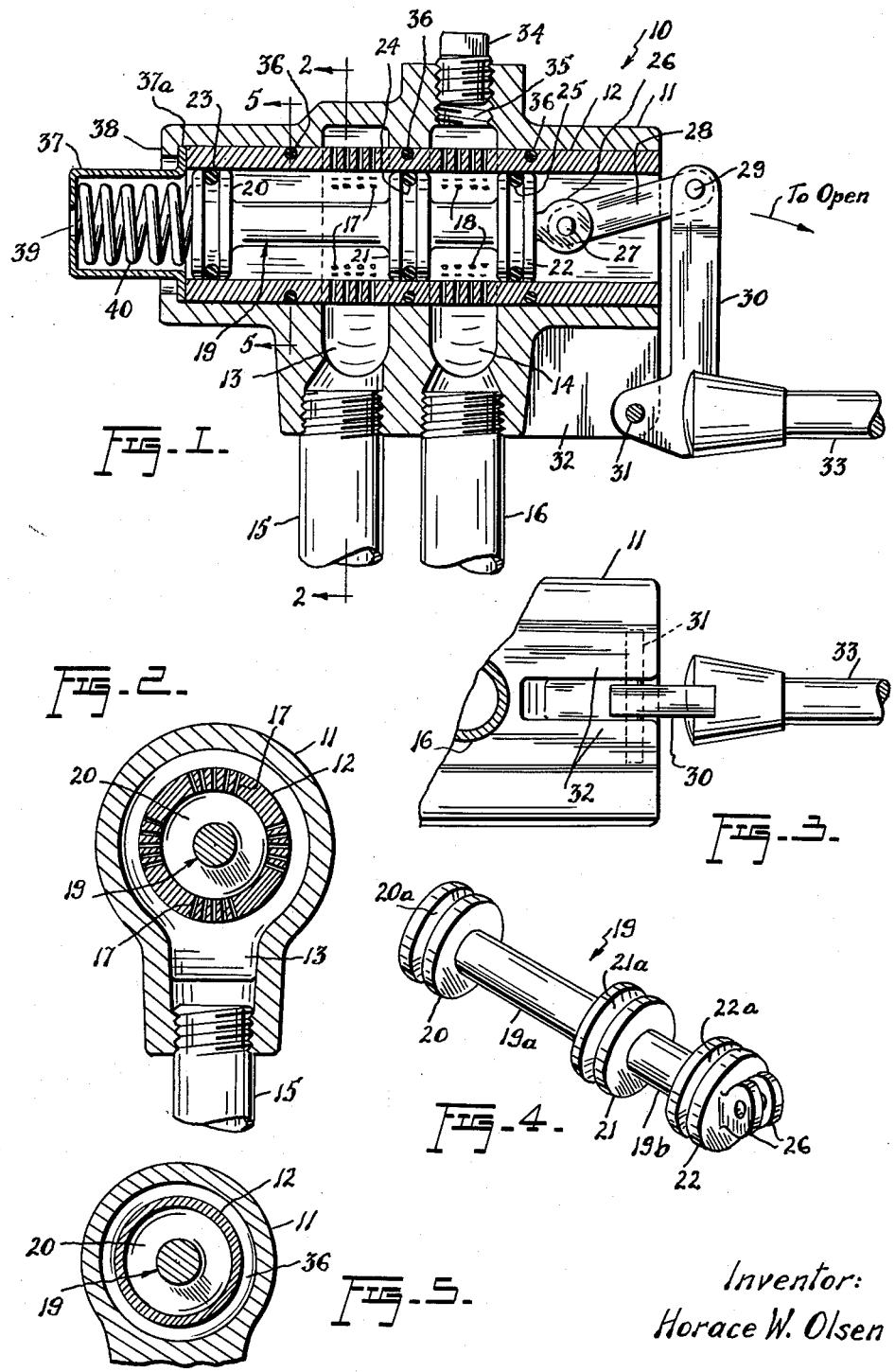

2,989,081
BALL COCK VALVES
Horace W. Olsen, 1904 Branard, Houston 6, Tex.
Filed Aug. 19, 1957, Ser. No. 678,800
1 Claim. (Cl. 137—625.37)

This invention relates to new and useful improvements in ball cock valves used in toilet tanks and the like, and the principal object of the invention is to provide a reliable, economical valve which has a large net flow opening to permit quick filling of the tank, which is virtually silent in operation under normal conditions, and which controls filling of the tank to a practically constant level irrespective of variations in water pressure of the system where the valve is used.

As such, an important feature of the invention resides in providing the housing of the valve with a sleeve of non-metallic material to accommodate a slidable valve member equipped with packing rings of material such as "neoprene," or the like, the sleeve being provided with inlet and outlet ports which are considerably smaller than the cross-sectional dimension of the packing rings. Accordingly, when the valve member slides in the sleeve and the packing rings pass the valve ports, the rings are not chipped or sheared by the relatively small ports, while the non-metallic material of the sleeve safeguards against the formation of sharp cutting edges at the periphery of the ports such as otherwise would damage the packing rings and result in premature wear of the valve.

Another important feature of the invention involves the arrangement of the inlet and outlet ports themselves, several such ports being provided in each set and each port being in the form of a cylindrical bore rather than in the form of an aperture, such a bore having a length substantially greater than its diameter and the combined effective area of the ports in the respective inlet and outlet sets being greater than the effective cross-section of the respective inlet and outlet pipes leading to and from the valve. As a result, a pressure loss is created at the outlet end or discharge end of each port and since the ports in each set are spaced, the flow of water therethrough is divided and recombined without a jet action and its undesirable, accompanying high-pitched noise, so that the valve is virtually silent in operation.

Another important feature of the invention resides in the provision of resilient means for resisting sliding of the valve member to its fully closed position, that is, near the point where a float controlling the valve reaches a predetermined "full" level in the tank, whereby to provide a reactive force against the float and assure closing of the valve at a constant level regardless of water pressure, as will be hereinafter more fully explained.

Some of the advantages of the invention lie in its simplicity of constuction, in its efficient and dependable operation, and in its adaptability to economical manufacture.

With the above more important objects and features in view and such other objects and features as may become apparent as this specification proceeds, the invention will be understood from the following description taken in conjunction with the accompanying drawings, wherein like characters of reference are employed to designate like parts, and wherein:

FIGURE 1 is a vertical sectional view of a ball cock valve in accordance with the invention;

FIGURE 2 is a cross-sectional view, taken substantially in the plane of the line 2—2 in FIGURE 1;

FIGURE 3 is a fragmentary underside plan view of the valve;

FIGURE 4 is a perspective view of the valve member with its packing rings omitted; and FIGURE 5 is a fragmentary cross-sectional view, taken substantially in the plane of the line 5—5 in FIGURE 1.

Referring now to the accompanying drawings in detail, the ball cock valve in accordance with the invention is designated generally by the reference numeral 10 and embodies in its construction an elongated housing 11 which may be of metal or any other suitable material. A tubular sleeve 12 of non-metallic material is mounted in the housing 11, the sleeve being open-ended as shown and being press-fitted or otherwise suitably installed in the housing so that it is non-movably retained therein. It is preferred that the sleeve be made of high density polyethylene or "Teflon," but any other suitable material may be used.

The housing 11 is provided with annular inlet and outlet chambers 13, 14, which surround the sleeve and are in communication with the respective water inlet and outlet pipes 15, 16, threaded into the housing, as shown. The chambers 13, 14 surround longitudinally spaced regions of the sleeve and these regions of the sleeve are provided with sets of inlet and outlet ports 17, 18, whereby the chambers 13, 14 communicate with the interior of the sleeve 12.

It is to be particularly noted that there are several closely spaced ports in each of the sets 17, 18 and that each port, rather than being merely an aperture or orifice, is in the form of a cylindrical bore, having a length substantially greater than its diameter.

A spool-type valve member 19 is slidable in the sleeve 12, the same including land portions 20, 21, 22 connected by stem portions 19a, 19b, the land portions being formed with annular grooves 20a, 21a, 22a, to accommodate suitable packing rings 23, 24, 25, such as O rings made of "neoprene" or other similar material. As will be readily apparent, the valve ports 17, 18 are substantially smaller than the cross-section of the packing rings 23, 24, 25, and it will be also noted that the total effective area of the ports in the respective sets 17, 18 is greater than the effective cross-section of the respective pipes 15, 16, the term "effective" being used in this sense to designate the size or dimension of passage available for fluid flow.

The portion 22 of the valve member 19 is provided with a yoke 26 to which is connected by a pivot pin 27 one end of a link 28, the latter projecting outwardly through the adjacent open end of the sleeve 12 and being connected by a pivot pin 29 to a lever 30 which, in turn, is pivoted by a pin 31 between depending flanges 32 formed integrally at the underside of the housing 11. The lever 30 is also equipped with an arm 33 provided at its free end with the usual float (not shown).

FIGURE 1 illustrates the valve in its closed position, it being noted that in this position the land 21 of the valve member 19 is disposed between the inlet and outlet sets of ports 17, 18, while the land 22 is at the outside of the outlet ports 18 and the land 20 is at the inside of the inlet ports 17, being spaced inwardly therefrom in a longitudinal direction by a sufficient extent to permit outward sliding of the valve member to its open position without the ports 17 being covered by the land 20. With the lowering of liquid level in the tank where the valve is installed, lowering of the arm 33 will be transmitted by the lever 30 and link 28 to slide the valve member 19 outwardly in the sleeve 12, that is, to the right as shown in FIGURE 1, until in the full open position of the valve the land 21 will be disposed at the outside of the outlet ports 18 and both the outlet ports and the inlet ports 17 will be in communication with the space between the lands 20, 21. In that position, water from the pipe 15 entering the chamber 13 will flow through the ports 17 into the sleeve 12 and outwardly through the ports 18 and chamber 14 to the outlet pipe 16, as will be clearly understood.

If desired, the housing 11 may be equipped with a suitable screw-threaded clean-out plug 34 positioned in a bore 35 in communication with the chamber 14, and suitable packing rings 36 may be provided at the outside of the sleeve 12, between and longitudinally outwardly of the chambers 13, 14, so as to prevent any possible leakage of water from these chambers to the outside of the housing.

A cup-shaped socket or seat 37 is provided on the housing 11 at the inner end of the sleeve 12, this seat having an outturned flange 37a which is disposed between an inturned flange 38 on the housing and the adjacent end of the sleeve, as illustrated. The member 37 is provided with an air vent 39 communicating with the atmosphere and accommodates a compression spring 40 which bears against the portion 20 of the valve member 19 when the latter approaches its fully closed position. The spring 40 is of such length that the valve member 19 is disengaged therefrom as it slides toward its open position, whereby the spring is effective only during the final stage of closing of the valve, and during the initial stage of its opening.

The various advantages resulting from the structural arrangement of the device will be readily apparent. The relatively small size of the ports 17, 18 with respect to the cross-section of the packing rings 23, 24, 25 will prevent the rings from being chipped or sheared by their passage over the ports. Additional safeguarding in this respect is provided by making the sleeve 12 of nonmetallic material, which does not present sharp edges at the ports such as otherwise would shear or cut the packing rings.

The ability of the valve to afford fast flow as well as silent flow resides in reconciling these two usually opposite requirements into a harmonious action which is facilitated by the cylindrical formation and close spacing of the ports 17, 18 in each set, and by the arrangement whereby the total effective area of ports in the respective sets is greater than the effective cross-section of the respective pipes 15, 16. The cylindrical form of the ports creates a pressure loss at the outlet or discharge end of each port and the spacing of the ports in each set allows the flow to divide and recombine, before and after passing through the thickness of the wall of the sleeve 12, without any jet action taking place and without the usual high-pitched noise present in conventional valves.

The ability of the valve to maintain constant level regardless of water pressure, which may range anywhere from ten to one hundred and twenty pounds per square inch, results from the provision of the spring 40 which becomes effective in the final stages of closing and initial stages of opening of the valve. Since the valve closes as a result of balanced dynamic forces such as are provided by the buoyancy of the rising float against the impact pressure of flowing water, the pressure drop across the last few open ports has an appreciable effect of back pressure against the float. This back pressure varies with the variation of pressure of supply and so changes the shut-off level of the dynamic balance. However, in the instant invention, the spring 40 introduces a reactive force against the float which is appreciably greater than the greatest force due to hydraulic imbalance at shut-off, and accordingly, the varying supply pressure produces only a small variation in the total reactive force and the shut-off level remains practically constant. As such, the constant level shut-off allows the level to be set an optimum height for reliability of operation and economy in water saving.

It is to be noted that although the invention is primarily intended for use as a ball cock valve in toilet tanks, it may be used with equal facility as a liquid level responsive valve of general application.

While in the foregoing there has been shown and described the preferred embodiment of the invention, various modifications may become apparent to those skilled in the art to which the invention relates. Accordingly, it is not desired to limit the invention to this disclosure, and various modifications may be resorted to, such as may lie within the spirit and scope of the appended claim.

What is claimed as new is:

In a ball cock valve, the combination of an elongated housing formed with a cylindrical open ended bore and provided at one end of said bore with an inturned annular flange, a tubular sleeve mounted in the bore of said housing and provided at longitudinally spaced regions thereof with sets of inlet and outlet ports extending radially of the sleeve and each having a length substantially greater than its diameter, said housing also being provided with annular inlet and outlet chambers surrounding said sleeve and having the respective inlet and outlet ports in communication therewith, a cup-shaped spring seat provided at one end of said housing and having an outturned annular flange disposed between the inturned annular flange of the housing and the adjacent end of said sleeve whereby to retain said spring seat in position, a compression spring positioned in said seat and projecting into the adjacent end portion of the sleeve, an elongated valve member slidable in said sleeve between open and closed positions in operative relation with the respective sets of ports, said valve member including first and second and third lands in sliding engagement with the inner surface of said sleeve, said first land being engageable with said spring when the valve is closed, the second and third lands being spaced longitudinally from each other and from the first land by a distance whereby the second and third lands straddle the outlet ports in said sleeve with the second land disposed between the outlet and the inlet ports in the closed position of the valve, the distance between the first and second lands being such that the first and second lands straddle both the inlet and outlet ports in the open position of the valve, and means connected to said valve member for sliding the same.

References Cited in the file of this patent

UNITED STATES PATENTS

| | | |
|---|---|---|
| 746,755 | Spencer | Dec. 15, 1903 |
| 1,274,924 | Michaels | Aug. 6, 1918 |
| 1,630,133 | Murphy | May 24, 1927 |
| 2,132,030 | Hunt | Oct. 4, 1938 |
| 2,524,142 | Seeloff | Oct. 3, 1950 |
| 2,596,534 | Crake | May 13, 1952 |
| 2,621,885 | Schmitt | Dec. 16, 1952 |
| 2,802,481 | Jahn | Aug. 13, 1957 |
| 2,826,215 | Wolfslau | Mar. 11, 1958 |

FOREIGN PATENTS

| | | |
|---|---|---|
| 540,411 | Great Britain | Oct. 16, 1941 |
| 305,208 | Switzerland | Apr. 16, 1955 |